UNITED STATES PATENT OFFICE.

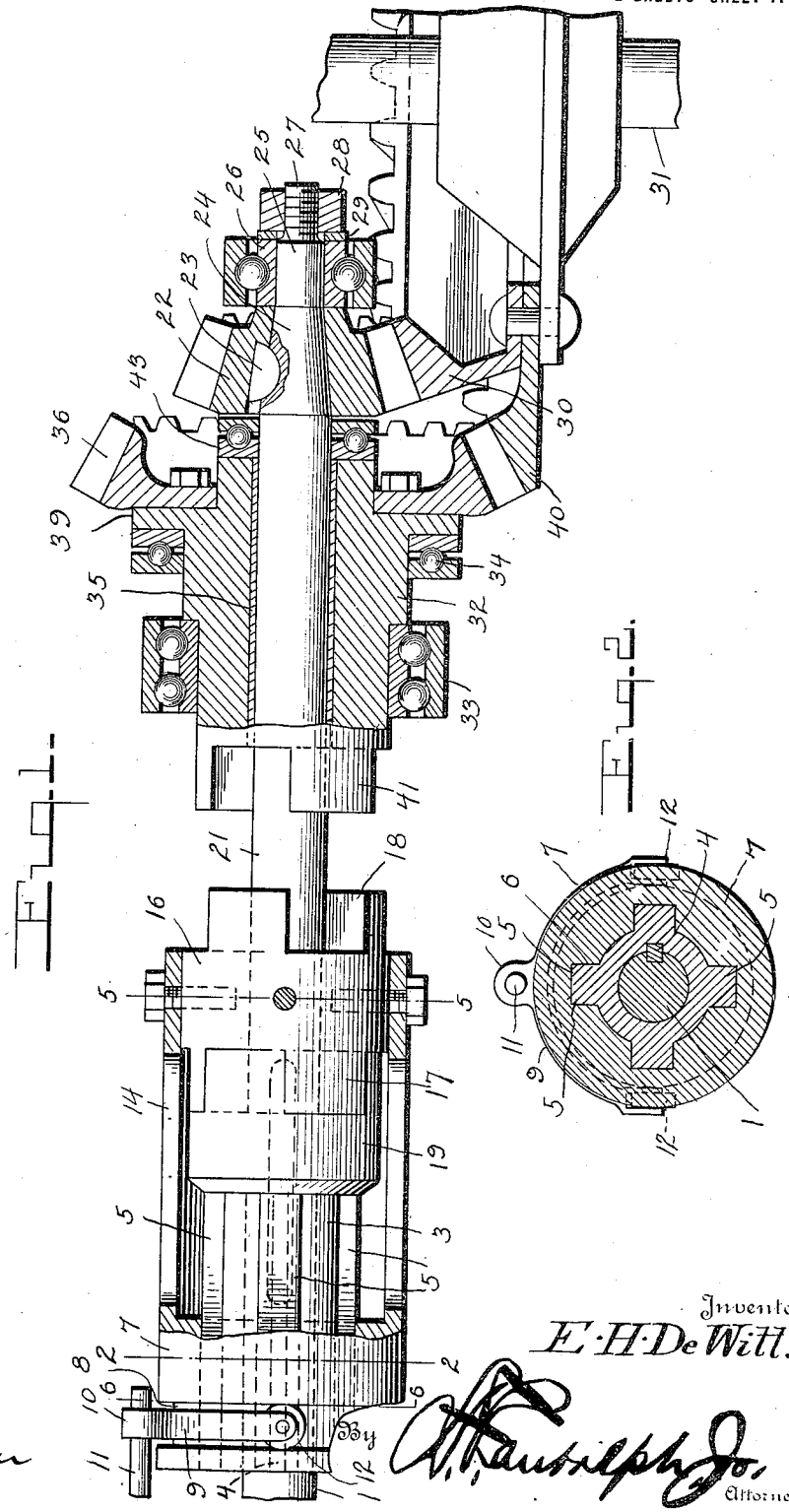
E. H. DE WITT.
SPEED CHANGING GEAR.
APPLICATION FILED SEPT. 3, 1915.
1,261,721.
Patented Apr. 2, 1918.
2 SHEETS—SHEET 1.

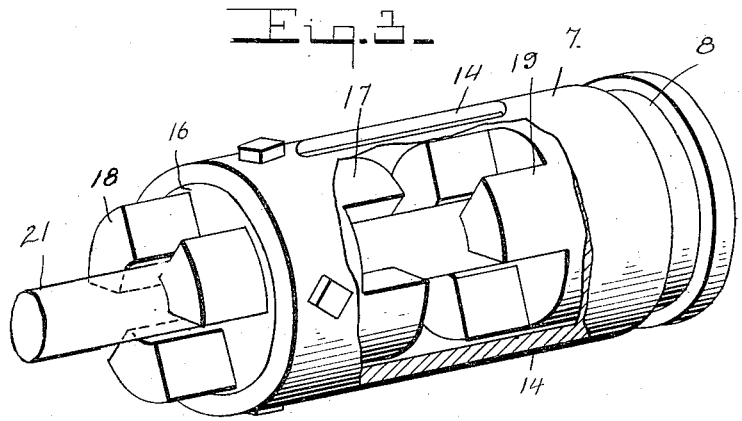
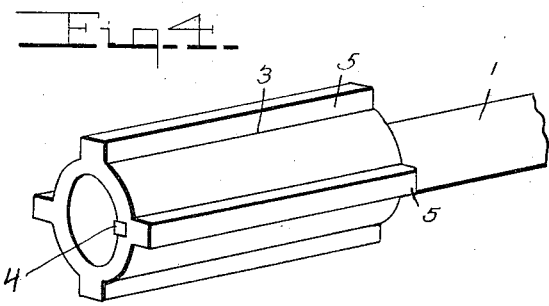
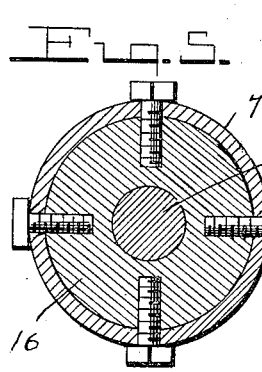
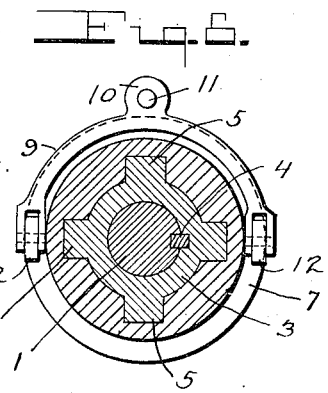

EDWARD H. DE WITT, OF LIBERTY, NEW YORK.

SPEED-CHANGING GEAR.

1,261,721.

Specification of Letters Patent.  Patented Apr. 2, 1918.

Application filed September 3, 1915.  Serial No. 48,833.

*To all whom it may concern:*

Be it known that I, EDWARD H. DE WITT, a citizen of the United States of America, residing at Liberty, in the county of Sullivan and State of New York, have invented certain new and useful Improvements in Speed-Changing Gears; and I do hereby declare the following to be a full, clear, and exact description of the invention, such as will enable others skilled in the art to which it appertains to make and use the same.

This invention relates to a mechanism for changing the speed of articles which are driven by the driving member, and more particularly to a mechanism for changing the speed of travel of motor vehicles or the like, and the primary object of the invention is to provide a multiple set of gears and clutches, of simple construction, for varying the speed of rotation of a driven member.

Another object of this invention is to provide a device as specified, which is constructed so as to permit of two speeds of rotation of the driven member, which includes a single slidable clutch operated by a single lever for movement into engagement with a pair of spaced clutches for changing the speed of rotation of the driven member.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a longitudinal section through the improved speed changing mechanism, showing parts thereof in elevation, Fig. 2 is a cross sectional view on the line 2—2 of Fig. 1, Fig. 3 is a perspective view of the slidable clutch member, Fig. 4 is a perspective view of the clutch end of the drive shaft, Fig. 5 is a section on the line 5—5 of Fig. 1, and Fig. 6 is a cross section on the line 6—6 of Fig. 1.

Referring more particularly to the drawings, 1 designates the engine or drive shaft. The shaft 1 has a collar 3 keyed thereon by means of a key 4. The collar 3 has a plurality of radially disposed ribs 5 formed upon its outer surface, diametrically opposite to each other, which ribs are seated in recesses 6, which are formed in a sliding sleeve 7. The sliding sleeve 7 is provided with an annular recess 8 formed near its rear end, in which are seated the arms 9 of a forked member 10. The forked member 10 is connected in any suitable manner to a shifting lever 11. The arms 9 of the forked member 10 have rollers 12 mounted upon their ends, which engage the walls of the recess 8 so as to reduce friction which might be occasioned by the rotation of the sleeve 7. The sleeve 7 is slidably carried by the drive shaft 1, for rotation therewith, by the insertion of the ribs 5 into the recesses 6.

The sleeve 7 has openings 14 formed therein. The outer end of the sleeve 7 is secured to a sliding clutch member 16. The sliding clutch member 16 is provided with clutching faces 17 and 18, which are formed upon its opposite sides.

The clutching face 17 of the slidable clutch member 16 is adapted for co-action with the clutching face of the clutch member 19, for rotating the slidable clutch member 16 and the shaft 21, by the rotation of the driving shaft 1. The clutch member 19 is formed upon one end of the shaft 21. The shaft 21 has a beveled gear 22 keyed thereon, by means of a key 23. The beveled gear 22 is mounted upon a tapered portion 24 of the shaft 21, and adjacent to the reduced end 25 of the shaft. The reduced end 25 of the shaft is seated in a bearing 26, and the terminal of the shaft is screw threaded, as is shown at 27, for receiving a nut 28, which jams against a washer 29 and the end of the bearing 26, for preventing longitudinal movement of the shaft 21.

The beveled gear 22 meshes with a beveled gear 30, which is carried by a driven member or axle 31.

The shaft 21 has a sleeve 32 rotatably mounted thereon, and supported by suitable bearings 33 and 34. The sleeve 32 has a bearing bushing 35 mounted therein, which engages the shaft 21, and it has a beveled gear 36 detachably connected to an annular collar 39 formed upon its forward end. The beveled gear 36 is of greater diameter than the beveled gear 22, and it meshes with a beveled gear 40, which is carried by the axle 31.

The sleeve 32 has a clutch member 41 formed upon its end opposite to the one upon which the beveled gear 36 is mounted and facing the sliding clutch collar 16. A bearing 43 is positioned between the end of the sleeve 32 and the hub of the beveled gear 22.

In the operation of the improved speed regulating structure heretofore described; the shaft 1 is driven by any suitable type of prime mover, and its rotation will rotate the collar 3 which is keyed thereto. When the sleeve 7 is moved, by means of actuating the shifting lever 11, so that the clutching face 17 of the sliding clutch collar 16 is in meshing engagement with the clutching face of the clutch member 19, the shaft 21 will be rotated synchronously with the rotation of the shaft 1. The rotation of the shaft 21 will rotate the beveled gear 22, which is keyed thereto, and consequently rotates the gear 30 and the axle 31 at a relatively low speed, owing to the relatively small diameter of the beveled gear 22.

When the lever 11 is shifted for moving the sliding clutch collar 16 so that the clutching face thereof will engage the clutching face 41 which is formed on the sleeve 32, the sleeve 32 will be rotated synchronously with the driving shaft 1, by the connection between the sleeve 7, the collar 3, the shaft 1 and the meshing of the clutching faces 18 and 41. The rotation of the sleeve 32 will permit the shaft 21 to run idle, and it will rotate the gear 40 and consequently the axle 31, through the meshing engagement between the gears 36 and 40. Owing to the increased diameter of the gear 36 over the gear 22, the speed of rotation will be greater when the sleeve 32 is rotated in the manner heretofore described, than when the axle is rotated by the rotation of the shaft 21 and the gear 22.

From the foregoing description taken in connection with the accompanying drawings the advantages of construction and of the method of operation of the improved speed changing gear will be readily apparent to those skilled in the art to which this invention appertains and, while in the foregoing description, the principle of the operation of this invention has been described, together with various features of construction, it is to be understood that certain minor features of construction, combination and arrangement of parts may be altered to suit practical conditions, provided such alterations are comprehended within the scope of what is claimed.

What is claimed is:—

In a device of the class described, a driving shaft, a collar keyed thereto, spaced radially projecting ribs formed on said collar, a sliding sleeve mounted upon said shaft and projecting beyond one end thereof, the inner end of said sliding sleeve being thickened and provided with spaced grooves for the reception of said radially projecting ribs, a driven shaft, a rotatable sleeve mounted upon said driven shaft, a relatively small beveled gear carried by the outer end of said driven shaft, a relatively large beveled gear carried by the outer end of said rotatably mounted sleeve, a clutch face formed on the inner end of said rotatably mounted sleeve, a clutch member keyed on the inner end of said driven shaft, a clutch face formed on the outer end of said clutch member, a clutch section detachably carried by the outer end of said sliding sleeve and positioned between said clutch member carried by the driven shaft and the clutch face formed on said rotatably mounted sleeve, inner and outer clutch faces formed on said clutch section, and means for operating the sliding sleeve, as and for the purpose specified.

In testimony whereof I affix my signature in presence of two witnesses.

EDWARD H. DE WITT.

Witnesses:
 B. A. RUSSELL,
 A. L. FIELD.

Copies of this patent may be obtained for five cents each, by addressing the "Commissioner of Patents, Washington, D. C."